US012558890B2

(12) United States Patent
Sugihara et al.

(10) Patent No.: US 12,558,890 B2
(45) Date of Patent: Feb. 24, 2026

(54) PRINTING APPARATUS

(71) Applicant: SCREEN HOLDINGS CO., LTD.,
Kyoto (JP)

(72) Inventors: Yuya Sugihara, Kyoto (JP); Tomoyasu Okushima, Kyoto (JP); Seiya Nomura, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 162 days.

(21) Appl. No.: 18/458,407

(22) Filed: Aug. 30, 2023

(65) Prior Publication Data

US 2024/0100827 A1 Mar. 28, 2024

(30) Foreign Application Priority Data

Sep. 22, 2022 (JP) .................................. 2022-151864
Feb. 27, 2023 (JP) .................................. 2023-028404

(51) Int. Cl.
*B41J 2/21* (2006.01)
*B41J 2/12* (2006.01)
*B41J 2/125* (2006.01)
*H04N 1/60* (2006.01)
*H04N 1/64* (2006.01)

(52) U.S. Cl.
CPC ................. *B41J 2/12* (2013.01); *B41J 2/125* (2013.01); *B41J 2/2142* (2013.01); *B41J 2/2146* (2013.01); *H04N 1/6033* (2013.01); *H04N 1/6036* (2013.01); *H04N 1/64* (2013.01)

(58) Field of Classification Search
CPC ... B41J 2/12; B41J 2/125; B41J 2/2142; B41J 2/2146; H04N 1/6033; H04N 1/6036; H04N 1/64
See application file for complete search history.

(56) References Cited

U.S. PATENT DOCUMENTS

| | | | |
|---|---|---|---|
| 2002/0057903 A1* | 5/2002 | Kubo ...................... | H04N 5/772 |
| | | | 386/E5.072 |
| 2014/0233071 A1 | 8/2014 | Kido | |
| 2015/0170008 A1* | 6/2015 | Hashizume ........ | H04N 1/00045 |
| | | | 358/1.15 |

(Continued)

FOREIGN PATENT DOCUMENTS

| | | | | |
|---|---|---|---|---|
| JP | 2019217676 A | * | 12/2019 | ............. B41J 21/00 |
| JP | 2021-005266 A | | 1/2021 | |

OTHER PUBLICATIONS

Extended European Search Report dated Feb. 29, 2024 of European Patent Application No. 23194291.3.

*Primary Examiner* — Yaovi M Ameh
(74) *Attorney, Agent, or Firm* — Rimon P.C.

(57) ABSTRACT

There is provided a technology that enables reduction of an amount of data to be processed in testing a printed image printed on a printing medium. A printing apparatus includes a printing unit, a camera, and an image-data output unit. The printing unit is capable of printing plural categories of test patterns on the printing medium. The camera captures an image of a test pattern printed on the printing medium, and outputs acquired image data to the image-data output unit. The image-data output unit reduces an amount of data of the image data output from the camera, in accordance with the category of the test pattern, and outputs acquired image data to a test apparatus.

8 Claims, 10 Drawing Sheets

(56) References Cited

U.S. PATENT DOCUMENTS

2015/0356385 A1* 12/2015 Naka .................. G06K 15/1807
                                                                358/1.15
2020/0410655 A1* 12/2020 Imamura ............... G06T 7/0004
2021/0287372 A1    9/2021 Akiyama

* cited by examiner

| CATEGORY OF PRINTED IMAGE | OUTPUT PATTERN |
| --- | --- |
| NOZZLE CHECK PATTERN | LUMINANCE DATA |
| SHADING CHECK PATTERN | PLAIN DATA |
| REGISTRATION ADJUSTMENT PATTERN | PLAIN DATA |
| FRONT/BACK VERIFICATION PATTERN | PLAIN DATA |
| GUI DISPLAY IMAGE | LOW-RESOLUTION DATA |
| PRINTING-QUALITY TEST IMAGE | RGB IMAGE DATA OR YCC-CONVERTED IMAGE DATA |

Fig. 3

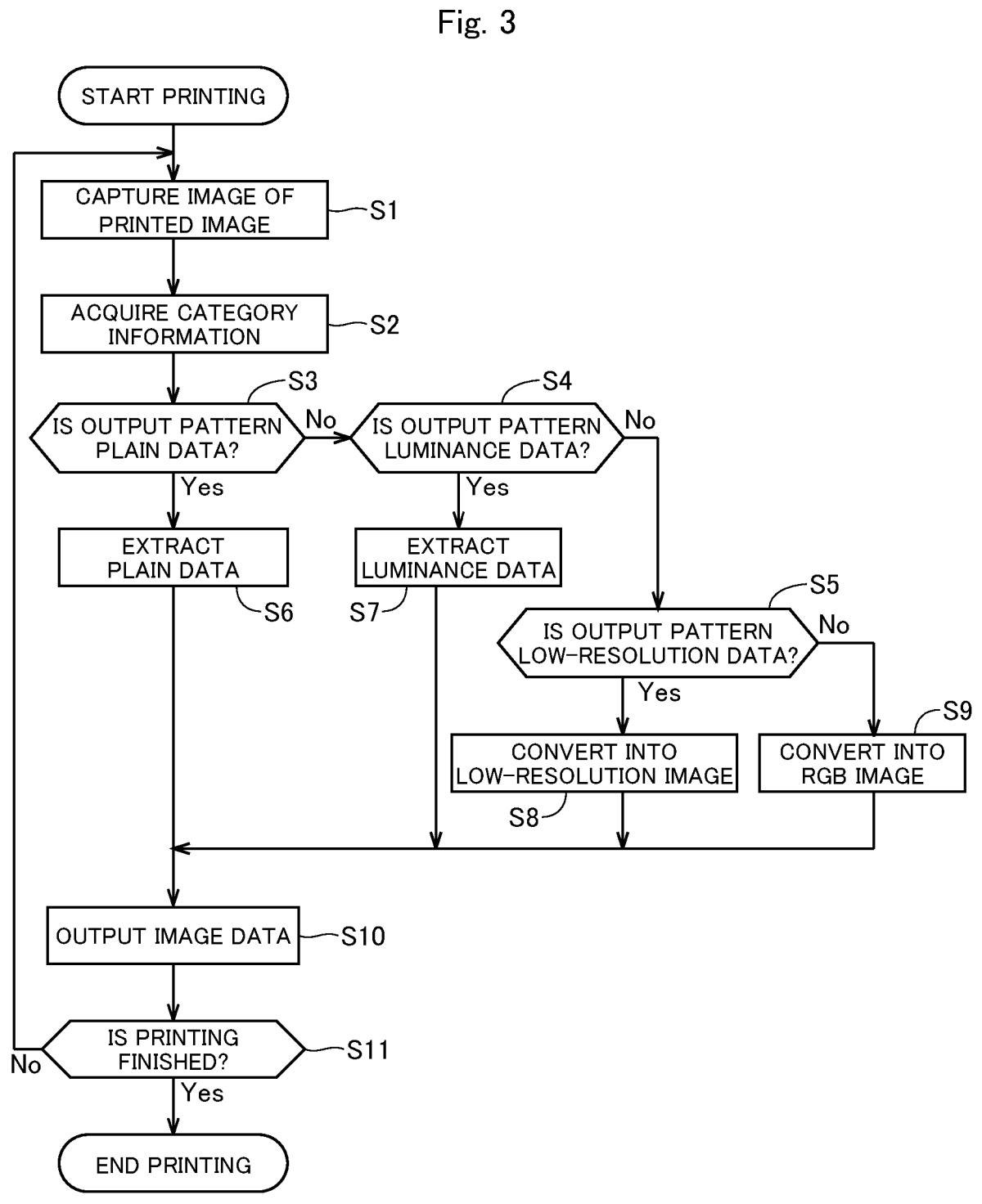

START PRINTING

CAPTURE IMAGE OF PRINTED IMAGE —S1

ACQUIRE CATEGORY INFORMATION —S2

IS OUTPUT PATTERN PLAIN DATA? —S3 No→ IS OUTPUT PATTERN LUMINANCE DATA? —S4 No→

↓Yes (S3)

EXTRACT PLAIN DATA —S6

↓Yes (S4)

EXTRACT LUMINANCE DATA —S7

IS OUTPUT PATTERN LOW-RESOLUTION DATA? —S5 No→

↓Yes

CONVERT INTO LOW-RESOLUTION IMAGE —S8

CONVERT INTO RGB IMAGE —S9

OUTPUT IMAGE DATA —S10

IS PRINTING FINISHED? —S11

No→

↓Yes

END PRINTING

| CATEGORY OF PRINTED IMAGE | OUTPUT PATTERN |
| --- | --- |
| NOZZLE CHECK PATTERN | LUMINANCE DATA |
| SHADING CHECK PATTERN | RGB DATA (10 BITS) |
| REGISTRATION ADJUSTMENT PATTERN | RGB DATA (8 BITS) |
| FRONT/BACK VERIFICATION PATTERN | G PLAIN DATA (8 BITS) |
| GUI DISPLAY IMAGE | RGB LOW-RESOLUTION DATA (8 BITS) |
| PRINTING-QUALITY TEST IMAGE | RGB DATA (8 BITS) |

PRINTING APPARATUS

RELATED APPLICATIONS

This application claims priority from Japanese Patent Applications No. 2022-151864, filed on Sep. 22, 2022, and No. 2023-028404, filed on Feb. 27, 2023. The entire teachings of the above applications are incorporated herein by reference.

BACKGROUND OF THE INVENTION

Field of the Invention

The subject matter disclosed in the present specification relates to a printing apparatus.

Description of the Background Art

Conventionally, there has been known a printing apparatus in which liquid droplets of ink are discharged from a nozzle of a printhead and printing is performed on a printing medium by an inkjet process. In this type of apparatus, an image of a printed image formed on a printing medium is captured by a camera, and the printed image is subjected to testing on the basis of acquired image data.

For example, Japanese Patent Application Publication No. 2021-005266 describes a technology in which it can be determined with sufficient accuracy whether a printed image output onto a printing medium from a printing apparatus is a defective image (truly defective image), on the basis of captured-image data acquired by image capture of the printed image.

SUMMARY OF THE INVENTION

Technical Problem

In recent years, as a printing speed is improved or the resolution of an image being tested increases, an amount of data to be processed per unit time tends to increase. The increase of an amount of data to be processed results in an increase of a processing burden on hardware, to increase the performance required of the hardware also. This may probably cause an increase of a cost involved in testing a printed image.

It is an object of the present invention is to provide a technology that enables reduction of an amount of data to be processed in testing a printed image printed on a printing medium.

Solution to Problem

To solve the above-described problem, the first aspect is directed to a printing apparatus including: a printing unit configured to be capable of printing plural categories of test patterns on a printing medium; a camera configured to output image data acquired by image capture of the test patterns; and an image-data output unit configured to be capable of reducing an amount of data of the image data output from the camera, in accordance with each category of the test patterns, and outputting acquired image data.

In the printing apparatus of the first aspect, the image data is output after an amount of data is reduced in accordance with each category of the test patterns. Thus, an amount of data to be output can be reduced as compared to that in a case in which image data is directly output irrespective of the category of a test pattern. Further, an amount of data to be processed in an external apparatus to which image data is input can be reduced accordingly.

A second aspect is directed to the printing apparatus of the first aspect, wherein, when one of the test patterns is a test pattern for checking discharge of ink from each nozzle, the image-data output unit outputs luminance data extracted from the image data.

In the printing apparatus of the second aspect, when the printed image is a test pattern for a nozzle check, luminance data is extracted and output to an external apparatus. Thus, an amount of data to be output can be reduced, and further, a nozzle check can be properly performed on the basis of the luminance data.

A third aspect is directed to the printing apparatus of the first aspect or the second aspect, wherein, when one of the test patterns is a test pattern for front/back verification in which a coincidence between a position of an image printed on a first surface of the printing medium and a position of an image printed on a second surface opposite to the first surface is verified, the image-data output unit outputs at least one piece of plain data selected from red plain data, green plain data, or blue plain data extracted from the image data.

In the printing apparatus of the third aspect, when the printed image is a test pattern for front/back verification, plain data of a specific color is extracted and output to an external apparatus. Thus, an amount of data to be output can be reduced, and further, front/back verification can be properly performed on the basis of the plain data of a specific color.

A fourth aspect is directed to the printing apparatus of any of the first to third aspects, wherein the image-data output unit outputs low-resolution image data in which resolution is reduced in the image data.

With the printing apparatus of the fourth aspect, an amount of data can be reduced by reduction of the resolution of the image data.

A fifth aspect is directed to the printing apparatus of any of the first to fourth aspects, further including a printing control unit configured to control the printing unit, wherein the printing control unit outputs category information indicating the categories of the test patterns to the image-data output unit, and the image-data output unit reduces an amount of data of the image data on the basis of the category information output from the printing control unit.

With the printing apparatus of the fifth aspect, an amount of data can be reduced on the basis of the category information output from the printing control unit.

A sixth aspect is directed to the printing apparatus of any of the first to fifth aspects, wherein the printing unit is capable of printing a test pattern including category information on the printing medium, the camera is capable of capturing an image of the category information, and the image-data output unit reads the category information included in the image data and reduces an amount of data of the image data on the basis of the read category information.

With the printing apparatus of the sixth aspect, an amount of data can be reduced on the basis of the category information read form the image data.

A seventh aspect is directed to the printing apparatus of any of the first to sixth aspects, wherein the image-data output unit recognizes an area of a test pattern included in the image data and a category of the test pattern by performing an image recognition process on the image data, and reduces an amount of data of the image data in accordance with the recognized category of the test pattern.

With the printing apparatus of the seventh aspect, the category of the image data can be identified directly from the image data.

An eighth aspect is directed to the printing apparatus of any of the first to seventh aspects, wherein the image-data output unit includes a bit reduction circuit configured to reduce the number of bits per pixel in the image data output from the camera.

With the printing apparatus of the eight aspect, an amount of data can be reduced by reduction of the number of bits.

A ninth aspect is directed to the printing apparatus of the eighth aspect, wherein the bit reduction circuit reduces the number of bits per pixel in the image data output from the camera when one of the test patterns is a pattern for front/back verification or a pattern for registration adjustment.

In the printing apparatus of the ninth aspect, when a test pattern is a patter for a nozzle check, a pattern for front/back verification, or a pattern for registration adjustment, the number of bits of the image data is reduced. Thus, an amount of data can be reduced.

A tenth aspect is directed to the printing apparatus of the eight aspect or the ninth aspect, wherein the image-data output unit outputs image data acquired without reduction of the number of bits per pixel in the image data output from the camera when one of the test patterns is a pattern for a shading check.

With the printing apparatus of the tenth aspect, a shading check can be performed on the basis of the image data in which the number of bits is not reduced and is large.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a view showing contents of a table that defines correspondences between categories of a printed image and output patterns;

FIG. 3 is a view showing operations of the printing apparatus during printing;

FIG. 8 is a view showing contents of a table that defines correspondences between categories of a printed image and output patterns according to a third preferred embodiment;

DESCRIPTION OF THE PREFERRED EMBODIMENTS

Figure 1:
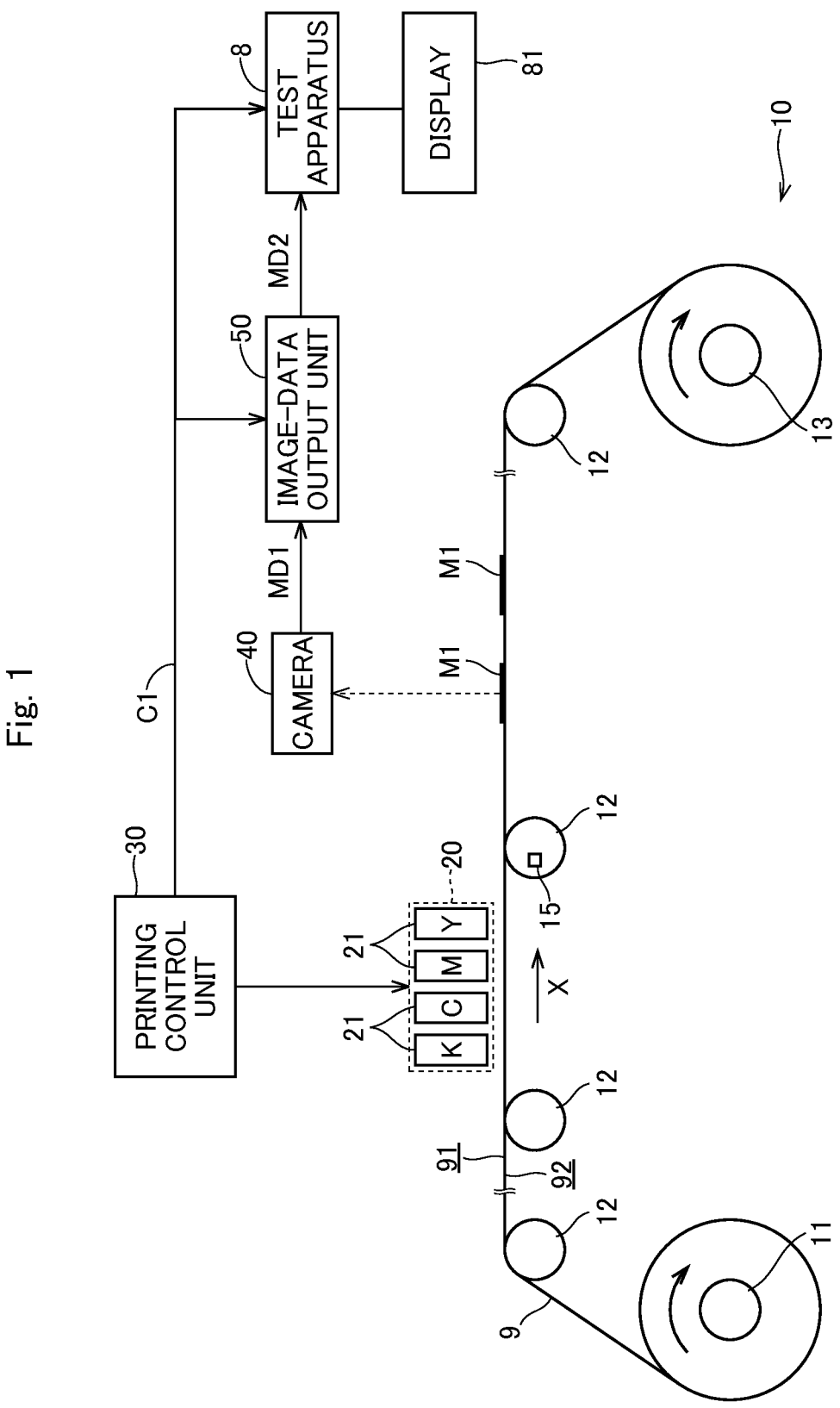
FIG. 1 is a view showing a configuration of a printing apparatus according to a first preferred embodiment.

Hereinafter, preferred embodiments of the present invention will be described with reference to the accompanying drawings. Note that components described in the preferred embodiments are mere examples and are not intended to limit the scope of the present invention to those only. In the drawings, for the purpose of easy understanding, the dimensions or the number of respective portions are shown in an overstated or understated manner in some portions, as necessary.

1. First Preferred Embodiment

FIG. 1 is a view showing a configuration of a printing apparatus 1 according to a first preferred embodiment. The printing apparatus 1 includes a conveyor unit 10, a printing unit 20, a printing control unit 30, a camera 40, and an image-data output unit 50.

The printing apparatus 1 discharges liquid droplets of ink (hereinafter referred to as "ink droplets") onto a printing medium 9 by an inkjet process, and forms an image on a printing surface of the printing medium 9. In this embodiment, the printing medium 9 is in a shape of a long strip (a shape of a web). The printing medium 9 is, for example, printing paper, a film made of resin, or metal foil.

The conveyor unit 10 continuously conveys the printing medium 9 from an upstream side to a downstream side by a roll-to-roll process along a predetermined conveyance path. Specifically, the conveyor unit 10 includes a feed roller 11, a plurality of conveyor rollers 12, and a take-up roller 13. The feed roller 11, each of the conveyor rollers 12, and the take-up roller 13 can rotate about an axis parallel to a width direction of the printing medium 9.

The feed roller 11 continuously feeds the printing medium 9 wound in a roll form on the outer surface of the feed roller 11. The plurality of conveyor rollers 12 are placed in predetermined positions on the conveyance path, respectively. Each of the conveyor rollers 12 supports the printing medium 9 being fed from the feed roller 11, from a back-surface side opposite to the printing surface. The take-up roller 13 takes up the printing medium 9 stretched over the plurality of conveyor rollers 12, into a roll form, to recover it.

The conveyor unit 10 includes a rotation drive unit such as a motor that rotates the take-up roller 13. Alternatively, the conveyor unit 10 may include a rotation drive unit that rotates the feed roller 11, or a part or a whole of the plurality of conveyor rollers 12.

The conveyor unit 10 includes a movement detection unit 15 configured to detect movement of the printing medium 9. The movement detection unit 15 includes a rotary encoder that detects an amount of rotation (rotation angle) of the conveyor roller 12. The movement detection unit 15 outputs a pulse signal to the printing control unit 30 each time the conveyor roller 12 rotates through a predetermined angle.

The printing unit 20 prints an image on a first surface 91 serving as the printing surface of the printing medium 9 that is conveyed in a first direction (a direction X indicated by an arrow in FIG. 1) by the conveyor unit 10. The printing unit 20 includes a plurality of printheads 21 configured to discharge ink droplets. In the present embodiment, the printhead 21 configured to discharge black (K) ink droplets, the printhead 21 configured to discharge cyan (C) ink droplets, the printhead 21 configured to discharge magenta (M) ink droplets, and the printhead 21 configured to discharge yellow (Y) ink droplets are sequentially arranged at some intervals along the first direction.

Note that a color of ink discharged by each of the printheads 21 can be changed to a randomly-selected color. Further, the printing unit 20 may include the printhead 21 configured to discharge ink droplets of a color different from K, C, M, and Y. Moreover, it is not essential that the printing unit 20 should include the plurality of printheads 21, and the printing unit 20 may include only one printhead 21.

In a surface facing the first surface 91 of the printing medium 9 in the printhead 21, a plurality of discharge nozzles (not shown) from which ink droplets are discharged are arranged along a second direction Y (the width direction of the printing medium 9) substantially perpendicular to the first direction X. The plurality of discharge nozzles are arranged along the width direction of the printing medium 9. A range in which the printhead 21 can discharge ink droplets (i.e., a printable range) extends over the entire width of the printing medium 9. The printing apparatus 1 is a so-called single-pass (one-pass) printing apparatus in which each of the printheads 21 discharges ink droplets and a printed image M1 is recorded onto the printing medium 9 while the printing medium 9 is passing through a space below the plurality of printheads 21 once.

The printing control unit 30 controls the printing unit 20. The printing control unit 30 is, for example, is a computer including a processor such as a CPU, a memory such as a RAM, and an auxiliary storage device such as a hard disk drive. Alternatively, the printing control unit 30 may include a dedicated electronic circuit such as an application-specific semiconductor integrated circuit (ASIC).

The printing control unit 30 controls discharge of ink droplets from each nozzle in each of the printheads 21 on the basis of image data to be printed on the printing medium 9 and an amount of movement of the printing medium 9 (i.e., a pulse signal output from the movement detection unit 15).

The printing control unit 30 outputs category information C1 to the image-data output unit 50 and a test apparatus 8. The category information C1 is data indicating a category of the printed image M1 included in image data MD1 acquired by the camera 40.

The camera 40 includes an image sensor that includes an imaging element such as a CCD or a CMOS, and captures an image of the printed image M1 with the use of the image sensor. The image sensor may be an area sensor including imaging elements that are arranged in a matrix of plural rows by plural columns, or a line sensor including imaging elements that are arranged along a straight line. The camera 40 outputs the image data MD1 acquired by image capture, to the image-data output unit 50.

The image-data output unit 50 recognizes the category of the printed image M1 on the basis of the received category information C1. Subsequently, the image-data output unit 50 applies the recognized category of the printed image M1 to a table T1 described later, to thereby acquire an output pattern corresponding to the category of the printed image M1. Then, the image-data output unit 50 performs data processing that reduces an amount of data in the image data MD1 in accordance with the output pattern, to acquire processed image data MD2. After that, the image-data output unit 50 outputs the acquired image data MD2 to the test apparatus 8. The image-data output unit 50 includes a circuit board, for example. An output pattern is set in advance for each category (image pattern) of the printed image M1 printed by the printing unit 20. Thus, the image-data output unit 50 outputs the image data MD2 that is acquired by performing a process of reducing an amount of data of the image data MD1 in accordance with the category of the printed image M1.

FIG. 2 is a view showing contents of the table T1 that defines correspondences between the categories of the printed image M1 and output patterns. The printing unit 20 can print various test patterns as the printed image M1. The categories of the various test patterns, specifically, include a "nozzle check pattern", a "shading check pattern", a "registration adjustment pattern", and a "front/back verification pattern" as shown in FIG. 2.

The "nozzle check pattern" shown in FIG. 2 is a test pattern for checking discharge of ink droplets from each nozzle of the printhead 21. In FIG. 2, as an output pattern corresponding to the nozzle check pattern, "luminance data" is set. The luminance data is image data represented by a luminance value indicated by the image data MD1. When the image data MD1 is the nozzle check pattern, the image-data output unit 50 outputs luminance data extracted from the image data MD1 to the test apparatus 8, as the image data MD2. Then, the test apparatus 8 tests an image for a nozzle check on the basis of the luminance data.

The "shading check pattern" shown in FIG. 2 is a test pattern for adjusting shades between the plurality of printheads 21. In FIG. 2, as an output pattern corresponding to the shading check pattern, "plain data" is set. The plain data is any of red plain data, green plain data, and blue plain data indicated by the image data MD1. When the image data MD1 is the shading check pattern, the image-data output unit 50 outputs plain data of a specific color extracted from the image data MD1 to the test apparatus 8, as the image data MD2.

Further, the "registration adjustment pattern" shown in FIG. 2 is a test pattern for correcting misregistration (misalignment between respective colors). Moreover, the "front/back verification pattern" is a test pattern for verifying a coincidence between a position of an image printed on the first surface 91 of the printing medium 9 and a position of an image printed on the second surface 92 opposite to the first surface 91 in the printing medium 9. In FIG. 2, as an output pattern corresponding to those test patterns, "plain data" is set, also. That is, when the image data MD1 is either of those test patterns, the image-data output unit 50 outputs plain data of a specific color extracted from the image data MD1, as the image data MD2.

The image-data output unit 50 outputs luminance data or plain data of a specific color in the above-described manner, and thus an amount of data to be output to the test apparatus 8 can be significantly reduced as compared to that in a case in which the image-data output unit 50 directly outputs the image data MD1.

The "GUI display image" shown in FIG. 2 is an image that is to be displayed on a display 81 included in the test apparatus 8. In FIG. 2, as an output pattern corresponding to the GUI display image, "low-resolution data" is set. The low-resolution data is image data in which the resolution is reduced in the image data MD1. The image-data output unit 50 outputs low-resolution data as the image data MD2, and thus an amount of data to be output to the test apparatus 8 can be significantly reduced as compared to that in a case in which the image data MD1 is directly output.

The "printing-quality test image" is an image for checking the printing quality of the printed image M1. An output pattern corresponding to the printing-quality test image is "RGB image data" or "YCC-converted image data". The "RGB image data" is an image formed of all of red plain data, green plain data, and blue plain data indicated by the image data MD1. The "YCC-converted image data" is an image obtained by conversion of an RGB image under the YCbCr scheme. Thus, when the image data MD1 is the printing-quality test image, the image-data output unit 50 outputs the image data MD2 indicating an RGB image or a YCC-converted image in which an amount of data is hardly reduced in the image data MD1, to the test apparatus 8.

The test apparatus 8 shown in FIG. 1 is connected to the image-data output unit 50 of the printing apparatus 1 such that the test apparatus 8 can communicate to/from the image-data output unit 50. The test apparatus 8 is, for example, a computer including a processor such as a CPU, a memory such as a RAM, and an auxiliary storage device such as a hard disk drive. The printing apparatus 1, in conjunction with the test apparatus 8, forms a printing system.

The test apparatus 8 tests the printed image M1 indicated by the image data MD2 on the basis of the image data MD2 output from the image-data output unit 50. A category of a test to be performed by the test apparatus 8 is determined on the basis of the category information C1 output from the printing control unit 30. Thus, the category information C1 can be regarded as test category information indicating a category of a test. For example, when the category of the printed image M1 is the nozzle check pattern, the test apparatus 8 performs a test for a nozzle check on the basis of the image data MD2 (for example, luminance data). Meanwhile, when the category of the printed image M1 is the shading check pattern, the test apparatus 8 performs a shading check on the basis of the image data MD2 (for example, plain data). Further, when the category of the printed image M1 is the registration adjustment pattern, the test apparatus 8 performs registration adjustment on the basis of the image data MD2 (for example, plain data). Further, when the category of the printed image M1 is the front/back verification pattern, the test apparatus 8 performs front/back verification on the basis of the image data MD2 (for example, plain data). Further, when the category of the printed image M1 is the printing-quality test image, the test apparatus 8 tests an image quality on the basis of the image data MD2 (for example, RGB image data or YCbCr-converted image data). Moreover, when the category of the printed image M1 is the GUI display image, the test apparatus 8 causes the display 81 to display the image data MD2 (for example, low-resolution image data).

Note that it is not essential that the category information C1 should be output from the printing control unit 30 to the test apparatus 8. For example, the image-data output unit 50 may output the category information C1 together with the image data MD2, to the test apparatus 8.

<Operations of Printing Apparatus>

FIG. 3 is a view showing operations of the printing apparatus 1 during printing. In the printing apparatus 1, at the start of printing, the camera 40 captures an image of the printed image M1 printed by the printing unit 20 (step S1). As described above, the camera outputs the image data MD1 acquired by image capture of the printed image M1, to the image-data output unit 50. Further, the image-data output unit 50 acquires the category information C1 corresponding to the printed image M1 printed by the printing unit 20 (step S2).

After the step S2, the image-data output unit 50 determines an output pattern of the image data MD2 that is to be output, on the basis of the acquired category information C1 (steps S3, S4, and S5). Specifically, when the output pattern is plain data (Yes in step S3), the image-data output unit 50 extracts plain data of a specific color from the image data MD1 (step S6). Meanwhile, when the output pattern is luminance data (Yes in step S4), the image-data output unit 50 extracts luminance data from the image data MD1 (step S7). When the output pattern is low-resolution data (Yes in step S5), the image-data output unit 50 coverts the image data MD1 into a low-resolution image (step S8). Further, when the output pattern is not any of plain data, luminance data, and low-resolution data (No in steps S3, S4, and S5), the image-data output unit 50 converts the image data MD1 into RGB image data (or YCbCr-converted image data) (step S9).

The image-data output unit 50 outputs the image data MD2 acquired in the step S6, S7, S8, or S9 to the test apparatus 8 (step S10). Then, when all steps for printing are finished (Yes in step S11), the printing apparatus 1 ends the printing process. On the other hand, in a case in which the printing process is not finished, the printing apparatus 1 performs the step S1 again.

As described above, in the printing apparatus 1 according to the present embodiment, when the category of the printed image M1 is an image pattern other than the printing-quality test image (i.e., any of the various test patterns and the GUI display image), the image-data output unit 50 outputs the image data MD2 in which an amount of data is reduced in the image data MD1, to the test apparatus 8. As a result, an amount of output data can be reduced as compared to that in a case in which the image data MD1 is directly output irrespective of the category of the printed image M1. This enables reduction of an amount of data communication between the image-data output unit 50 and the test apparatus 8. Further, in the test apparatus 8, an amount of data to be processed can be reduced. This allows reduction of the performance of the hardware and reduction of a cost associated with the apparatus.

2. Second Preferred Embodiment

Next, a second preferred embodiment will be described. Note that, in the following description, components having functions similar to those of the components described above are denoted by the same reference signs or the same reference signs to which alphabets are suffixed, and detailed description thereof is omitted as appropriate.

Figure 4:
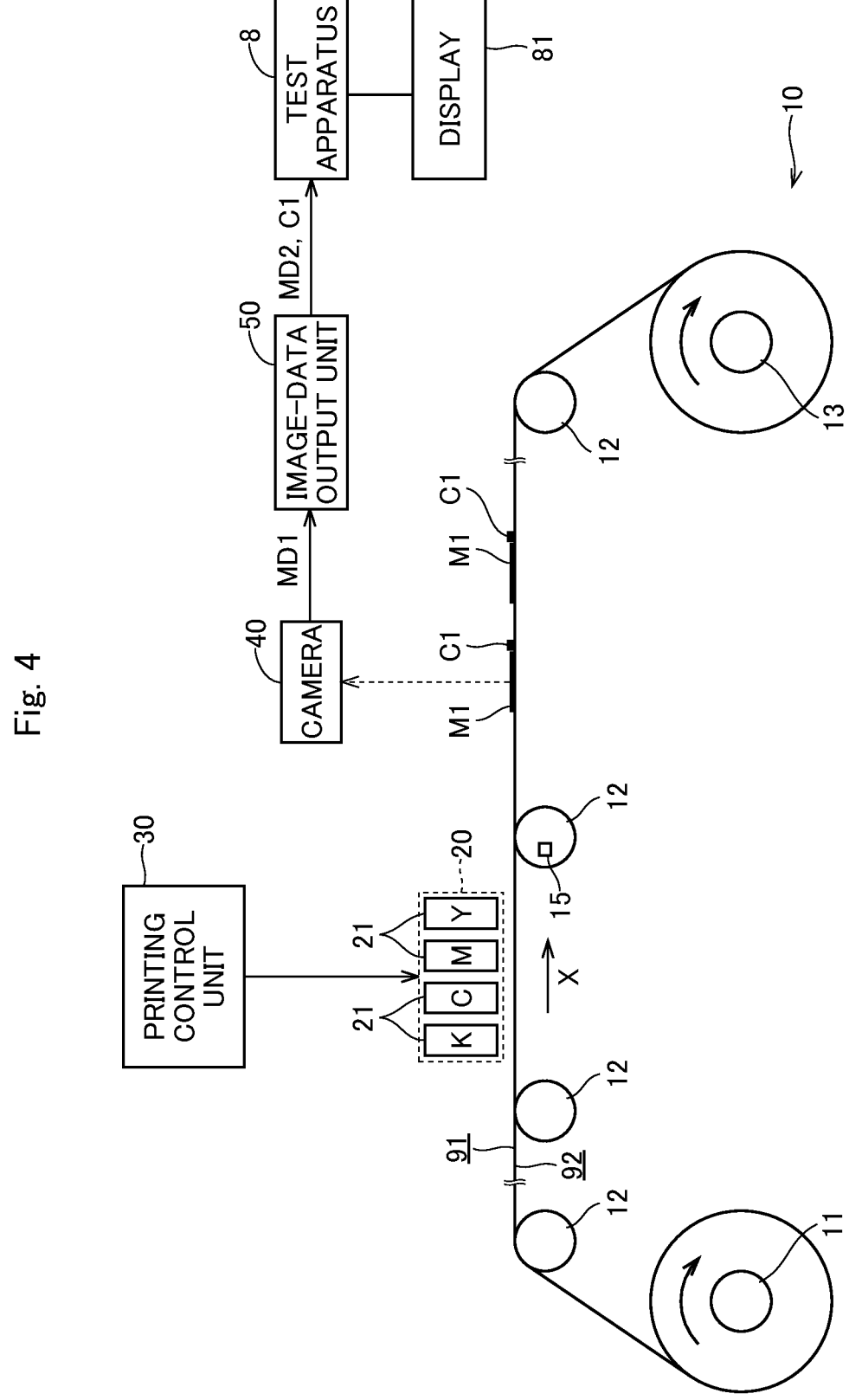
FIG. 4 is a view showing a configuration of a printing apparatus according to a second preferred embodiment.

FIG. 4 is a view showing a configuration of a printing apparatus 1A according to the second preferred embodiment. In the printing apparatus 1A, the printing control unit 30 does not output the category information C1 to the image-data output unit 50, and instead, the printing control unit 30 controls the printing unit 20, to cause the printing unit to print an image indicating the category information C1 (for example, a one-dimensional code or a two-dimensional code), together with the printed image M1. Then, the camera 40 captures an image of the image indicating the category information C1, together with an image of the printed image M1. As a result, the image indicating the category information C1, together with the printed image M1, can be included in the image data MD1 acquired by image capture by the camera 40. The image-data output unit 50 reads out the category information C1 included in the image data MD1, to recognize the read category of the image data MD1. Subsequently, the image-data output unit 50 performs a process of reducing an amount of data provided to the image data MD1, in accordance with an output pattern corresponding to the category of the image data MD1. Then, the image-data output unit 50 outputs the thus acquired image data MD2 to the test apparatus 8. Further, the image-data output unit 50 outputs the read category information C1, together with the image data MD2, to the test apparatus 8.

The test apparatus 8 tests the printed image M1 on the basis of the image data MD2 and the category information C1 output from the image-data output unit 50. Note that it is not essential that the category information C1 should be output from the image-data output unit 50 to the test apparatus 8. For example, the printing control unit 30 may output the category information C1 to the test apparatus 8.

Also in the printing apparatus 1A, when the printed image M1 is one of the various test patterns or the GUI display image, the image-data output unit 50 reduces an amount of data of the image data MD1 in accordance with an output pattern corresponding to the category information C1, and outputs the acquired image data MD2 (luminance data, plain data of a specific color, or a low-resolution image) to the test apparatus 8. Thus, an amount of data can be reduced on the basis of the category information C1 read from the image data MD1.

Alternatively, the image-data output unit 50 may directly recognize the category of the image data MD1 by performing an image recognition process on the read image data MD1. In such a case, there is no need of printing an image indicating the category information C1 (for example, a one-dimensional code or a two-dimensional code) near the printed image M1, which enables enlargement of the effective printing area of the printing medium 9.

Figure 5:
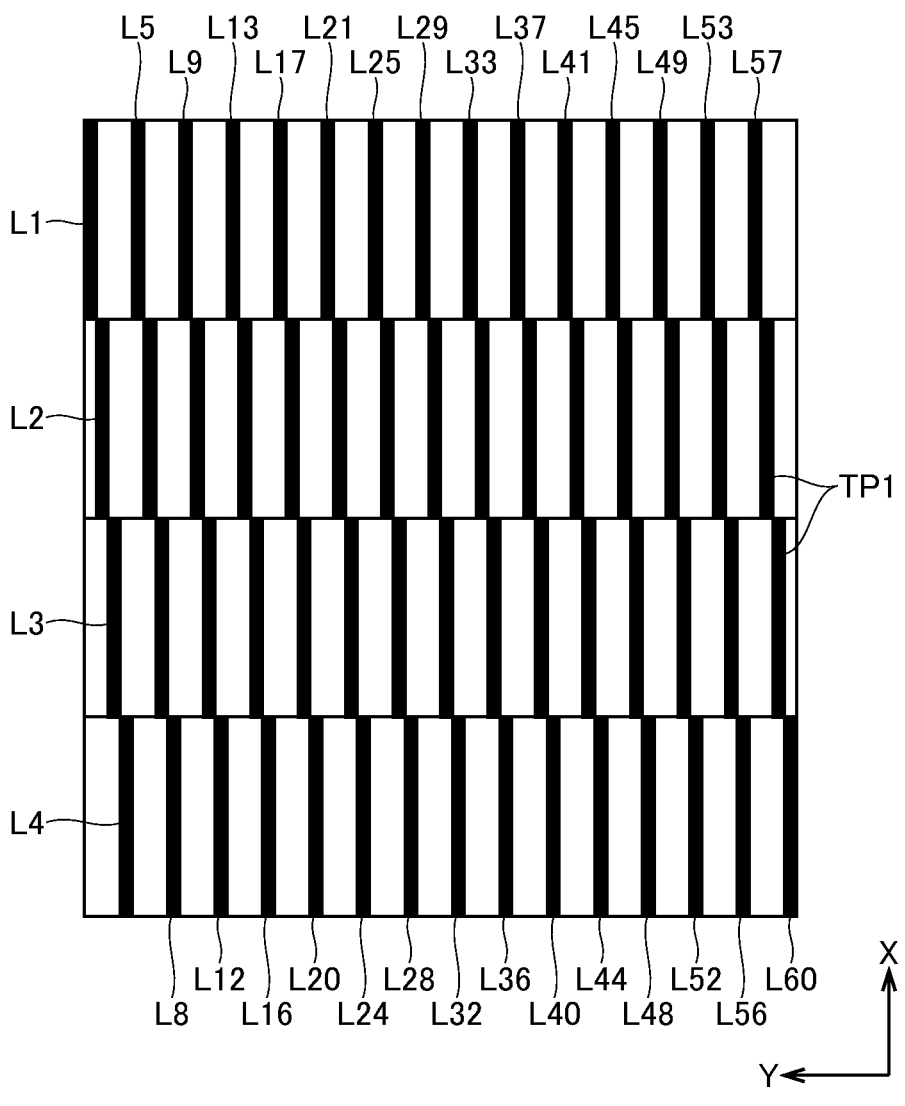
FIG. 5 shows an example of a nozzle check pattern.

FIG. 5 shows an example of the nozzle check pattern. On the printing medium 9, a test pattern TP1 for a nozzle check is printed by the printheads 21. In the test pattern TP1, lines that are respectively printed by a plurality of nozzles N1 to N60 arranged along the second direction Y in the printheads 21 and each extend along the first direction X are defined as lines L1 to L60, respectively. For the test pattern TP, four nozzles out of the nozzles of the printheads 21 are sequentially grouped, to form 15 groups (15 groups including a group of the nozzles N1 to N4, a group of the nozzles N5 to N8, a group of the nozzles N9 to N12, . . . , a group of the nozzles N53 to N56, and a group of the nozzles N57 to N60). Then, in each group, the nozzles are caused to discharge ink at discharge times that are staggered for each nozzle, so that a pattern printed in a step-like shape is formed.

Thus, the test pattern TP1 for a nozzle check is a pattern that includes the plurality of lines L1 to L60 each extending along the first direction X. The image-data output unit 50 performs an image recognition process on the image data MD1, to thereby recognize that an area having such characteristic (a pattern in which a plurality of lines that each extend along the first direction X and appear repeatedly along the second direction Y) in the image data MD1 is the nozzle check pattern.

Figure 6:
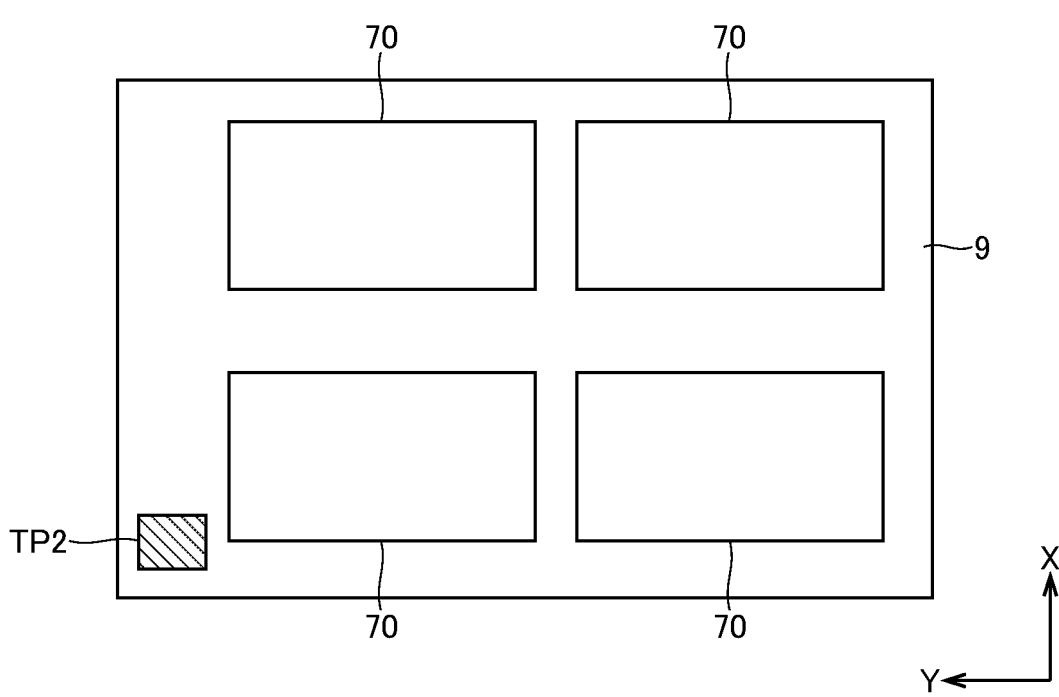
FIG. 6 shows an example of a front/back verification pattern.

FIG. 6 shows an example of the front/back verification pattern. On the printing medium 9, a test pattern TP2 for front/back verification is printed by the printheads 21. The test pattern TP2 is displaced in the second direction Y with respect to a printing area of an actual image 70, and is printed near the edge of the printing medium 9. The test pattern TP2 is a solid fill pattern with a constant high density. Typically, the test pattern TP2 has a size smaller than that of the actual image 70. The image-data output unit 50 performs an image recognition process on the image data MD1, to thereby recognize that an area having such characteristic (a solid fill pattern with a constant high density, which has a relatively small size and is printed near the edge of the printing medium 9) in the image data MD1 is the front/back verification pattern.

Figure 7:
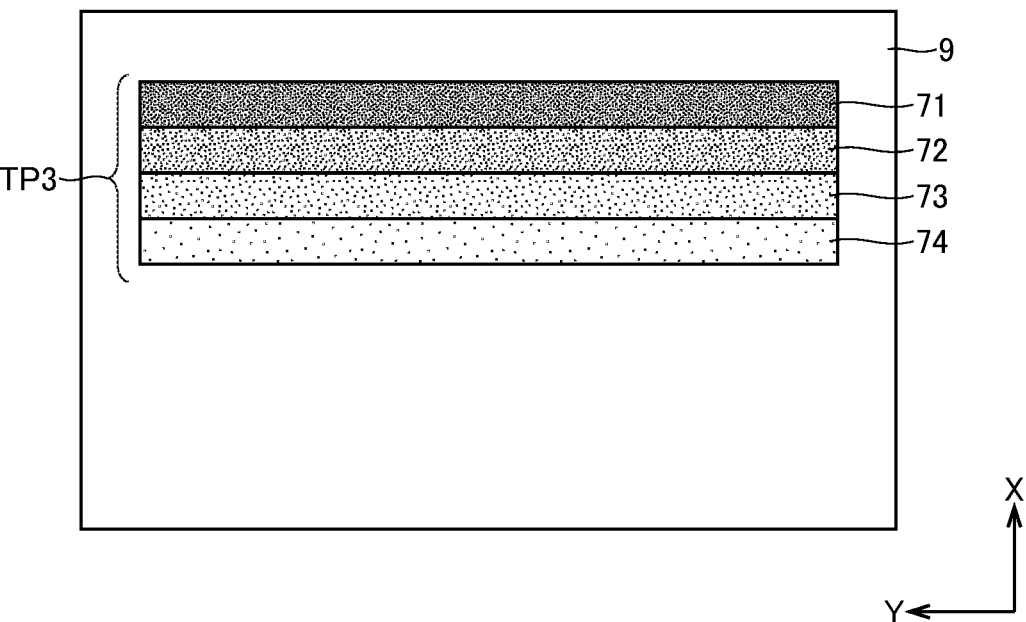
FIG. 7 shows an example of a shading check pattern.

FIG. 7 shows an example of the shading check pattern. On the printing medium 9, a test pattern TP3 for a shading check is printed by the printheads 21. The test pattern TP3 is formed of a plurality of strip-shaped images 71 to 74 that are short along the first direction X and are long along the second direction Y. The plurality of strip-shaped images 71 to 74 are each a solid fill pattern with a constant density, and have different densities, respectively. The image-data output unit 50 performs an image recognition process on the image data MD1, to thereby recognize that an area having such characteristic (a plurality of solid fill patterns that are each short along the first direction X, are each long along the second direction Y, and have different densities) in the image data MD1 is the shading check pattern.

Also for the registration adjustment pattern, the GUI display image, and the printing-quality test image, the image-data output unit 50 performs an image recognition process in the same manner as described above, to thereby automatically recognize areas of those images included in the image data MD1 and the categories of the images.

As described above, the image-data output unit 50 performs an image recognition process on the image data MD1, to thereby recognize an area of a test pattern included in the image data MD1 and the category of the test pattern. Then, the image-data output unit 50 applies the recognized category of the test pattern to the table T1, to acquire a category of an output pattern corresponding to the test pattern. Further, the image-data output unit 50 can perform a process of reducing an amount of data in the image data MD1 in accordance with the acquired output pattern, and output the resultant image data to the test apparatus 8. Alternatively, the image-data output unit 50 may output also an area of a test pattern and a category of the test pattern that are acquired by an image recognition process, to the test apparatus 8.

3. Third Preferred Embodiment

The image-data output unit 50 may output the image data MD2 in which an amount of data is reduced in the image data MD1 output from the camera 40 by reduction of the number of bits per pixel (hereinafter simply referred to as "the number of bits"), to the test apparatus 8. The number of bits of an image is the number of bits per pixel used for representing the depth of a color (color depth) and the degree of color in the image. The larger the number of bits is, the more finely, information about a color or shades of the image can be represented. On the other hand, the larger the number of bits is, the larger the file size is. In the following description, it is supposed that the camera 40 outputs 10-bit image data MD1, that is, the image data MD1 in which each of colors R, G, and B is represented by 10 bits, to the image-data output unit 50.

FIG. 8 is a view showing contents of a table T2 that defines correspondences between the categories of the printed image M1 and output patterns according to a third preferred embodiment. Each of the numbers of bits shown in the "output pattern" column in the drawing is the number of bits per pixel in the image data MD2 output from the image-data output unit 50.

In the table T2 shown in FIG. 8, when the category of the printed image M1 is the nozzle check pattern, luminance data is set as an output pattern. When the category of the printed image M1 is the shading check pattern, 10-bit RGB data is set as an output pattern. When the category of the printed image M1 is the registration adjustment pattern, 8-bit RGB data is set as an output pattern. When the category of the printed image M1 is the front/back verification pattern, 8-bit G plain data is set as an output pattern. When the category of the printed image M1 is the GUI display image, 8-bit RGB data (with low resolution) is set as an output pattern. When the category of the printed image M1 is the printing-quality test image, 8-bit RGB data is set. That is, when the category of the printed image M1 is the registration adjustment pattern, the front/back verification pattern, the GUI display image, or the printing-quality test image, the image-data output unit 50 converts the 10-bit image data MD1 output from the camera 40 into 8-bit image data MD2. The reduction of the number of bits to obtain eight bits may be achieved by reduction of lower two bits in 10 bits, for example.

Further, in the table T2, when the printed image M1 is the shading check pattern, the number of output bits is set to 10. That is, when the category of the printed image M1 is the shading check pattern, the image-data output unit 50 outputs 10-bit image data MD2 for 10-bit image data MD1. Thus, when the category of the printed image M1 is the shading check pattern, a process of reducing the number of bits is not performed.

Figure 9:
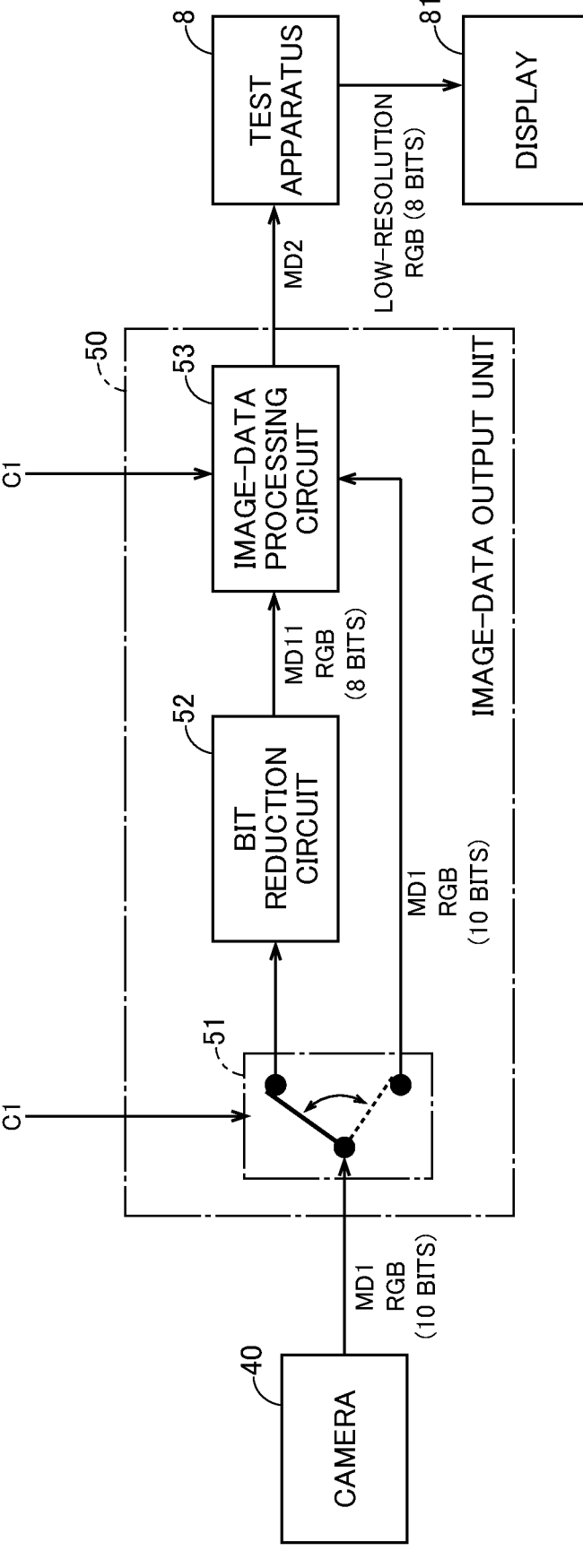
FIG. 9 is a view showing a block diagram of an image-data output unit according to the third preferred embodiment.

FIG. 9 is a block diagram showing details of the image-data output unit 50 according to the third preferred embodiment. The image-data output unit 50 includes a switching circuit 51, a bit reduction circuit 52, an image-data processing circuit 53.

The switching circuit 51 receives the image data MD1 output from the camera 40, and selectively outputs the image data MD1 to the bit reduction circuit 52 or the image-data processing circuit 53 in accordance with an instruction indicated by the category information C1. Specifically, when the category information C1 indicates either the nozzle check pattern or the shading check pattern, the switching circuit 51 outputs the image data MD1 to the image-data processing circuit 53. Meanwhile, when the category information C1 indicates any of the registration adjustment pattern, the front/back verification pattern, and the GUI display image, the switching circuit 51 transmits the image data MD1 to the bit reduction circuit 52. The bit reduction circuit 52 degenerates the received image data MD1 (10 bits) into eight bits, and outputs 8-bit RGB data as image data MD11.

The image-data processing circuit 53 receives the 10-bit image data MD1 and the 8-bit image data MD11 described above. Then, the image-data processing circuit 53 appropriately processes the received data and outputs the processed data to the test apparatus 8, as the processed image data MD2, in accordance with an instruction indicated by the category information C1. Specifically, when the category information C1 indicates the nozzle check pattern, the image-data processing circuit 53 performs a process of converting the image data MD1 into luminance data. Meanwhile, when the category information C1 indicates the shading check pattern, the image-data processing circuit 53 performs no specific process on the image data MD1. When the category information C1 indicates the registration adjustment pattern, the image-data processing circuit 53 performs no specific process on the image data MD11. When the category information C1 indicates the front/back verification pattern, the image-data processing circuit 53 performs a process of extracting only G plain data from the image data MD11 (RGB data). When the category information C1 indicates the GUI display image, the image-data processing circuit 53 performs a process of reducing the resolution of the image data MD11. When the category information C1 indicates the printing-quality test image, the image-data processing circuit 53 performs no specific process, or performs a YCC conversion process, on the image data MD11.

Figure 10:
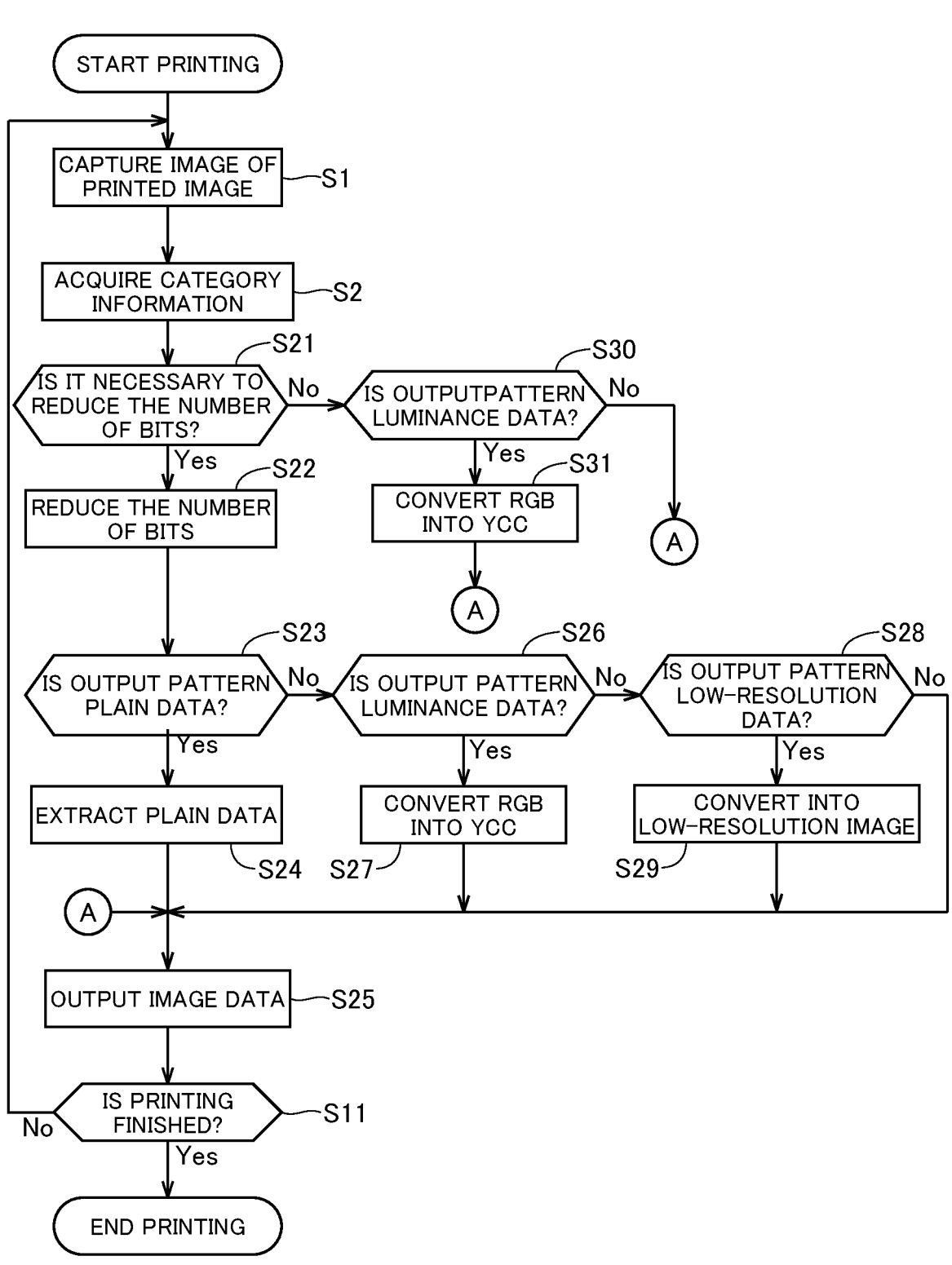
FIG. 10 is a view showing operations of a printing apparatus according to the third preferred embodiment.

FIG. 10 is a view showing operations of the printing apparatus 1 according to the third preferred embodiment. The steps S1 and S2 shown in FIG. 10 are the same as the step S1 and S2 shown in FIG. 3 according to the first preferred embodiment, respectively. However, the present embodiment is different from the first preferred embodiment in processes to be performed after the step S2. In the following, description of a part common to the first and third preferred embodiments is omitted, and differences will be described in detail.

After acquiring the category information C1 corresponding to the printed image M1 in the step S2, the image-data output unit 50 determines whether it is necessary to reduce the number of bits of the image data MD1 on the basis of the category of the printed image M1 indicated by the acquired category information C1 and the definition in the table T2 (step S21). For example, when the category of the printed image M1 indicated by the category information C1 is the registration adjustment pattern, the front/back verification pattern, the GUI display image, or the printing-quality test image, the image-data output unit 50 determines that it is necessary to reduce the number of bits in the step S21. When the category of the printed image M1 indicated by the category information C1 is the shading check pattern, the image-data output unit 50 determines that it is unnecessary to reduce the number of bits in the step S21.

When it is determined that it is necessary to reduce the number of bits in the step S21 (Yes in step S21), the image-data output unit 50 reduces the number of bits of the image data MD1 output from the camera 40 (step S22). Specifically, the image-data output unit 50 reduces the number of bits of the image data MD1 from 10 bits to eight bits, to form the image data MD11. Then, the image-data output unit 50 performs the processes of a step S23 and afterward. Specifically, when an output pattern is plain data, the process proceeds to a step S24, in which a process of extracting G plain data from the image data MD11 is performed. In a step S25 subsequent thereto, the G plain data is output to the test apparatus 8, as the image data MD2 having been processed for use as a front/back verification pattern.

When the answer is No in the step S23, in a step S26 subsequent thereto, it is determined whether an output pattern is luminance data. When the answer is Yes in the step S26, in a step S27 subsequent thereto, the image data MD11 is subjected to RGB-to-YCC conversion, so that luminance data is formed. The luminance data may be output to the test apparatus 8, as the image data MD2 having been processed for use in a printing-quality test, in the step S25.

When the answer is No in the step S26, in a step S28 subsequent thereto, it is determined whether an output pattern is low-resolution data. When the answer is Yes in the step S28, in a step S29 subsequent thereto, the image data MD11 is subjected to conversion for lower resolution, so that low-resolution RGB data (eight bits) is formed. The thus formed data is output to the test apparatus 8, as the image data MD2 having been processed for use in GUI display, in the step S25.

When the answer is No in the step S28, the process proceeds to the step S25, in which the image data MD11 (8-bit RGB data) is output to the test apparatus 8, as either the image data MD2 having been processed for use as a registration adjustment pattern or the image data MD2 having been processed for use in a printing-quality test.

The description will refer back to the process of determining whether it is necessary to reduce the number of bits in the step S21. When the answer is No in the step S21, the process proceeds to a step S30. In the step S30, it is determined whether an output pattern is luminance data. When the answer is Yes in the step S30, in a step S31 subsequent thereto, the image data MD1 is subjected to RGB-to-YCC conversion, so that luminance data is formed. The luminance data is output to the test apparatus 8, as the image data MD2 having been processed for use as a nozzle check pattern, in the step S25.

When the answer is No in the step S30, the process proceeds to the step S25, in which 10-bit RGB data is output to the test apparatus 8, as the image data MD2 having been processed for use as a shading check pattern. The 10-bit RGB data may be output to the test apparatus 8, as the image data for use in a printing-quality test.

In performing a shading check, the test apparatus 8 tests variation in an amount of ink discharge among the plurality of discharge nozzles included in the printheads 21 on the basis of shades indicated by the image data MD2 output from the image-data output unit 50. A shading check is performed on the basis of the image data MD2 in which the number of bits is not reduced and is large, in other words, shades are finely represented. This allows accurate testing of variation in shades, to thereby enable accurate testing of variation in an amount of ink discharge among the discharge nozzles.

When the shading check reveals that an amount of variation is equal to or larger than a predetermined amount, the test apparatus 8 may display an alarm on the display 81. Further, the test apparatus 8 generates a correction signal for correcting variation in a discharge amount for each discharge nozzle, and transmits the correction signal to the printing control unit 30. The printing control unit 30 drives each discharge nozzle on the basis of the correction signal transmitted from the test apparatus 8. In this manner, the printheads 21 can form a uniform-density image on the printing medium 9.

Further, when the category of the printed image M1 is the registration adjustment pattern, the front/back verification pattern, the GUI display image, or the printing-quality test image, it is determined that it is necessary to reduce the number of bits in the step S21. The number of bits of the image data MD1 output from the camera 40 is reduced from 10 bits to eight bits in the step S22. Then, conversion of image data to serve the purpose is performed in the steps S24 and S27, or the step S29, and thereafter, the image data MD2 is output to the test apparatus 8. In this case, an amount of output data can be reduced as compared to that in a case in which 10-bit image data MD2 is output to the test apparatus 8. This enables reduction of an amount of data communication between the image-data output unit 50 and the test apparatus 8. Further, for the test apparatus 8, an amount of data to be processed can be reduced. Therefore, the performance of the hardware can be reduced, and accordingly, a cost associated therewith can be reduced.

Further, in the third preferred embodiment, it is not essential that the steps S23 and S24 and the steps S26 to S31 shown in FIG. 10 should be performed. Specifically, the image-data output unit 50 may reduce the number of bits of the image data MD1 in accordance with the category of the printed image M1 in the step S21 and the step S22, and thereafter, may output the image data MD1 in which the number of bits has been reduced, to the test apparatus 8, as the image data MD2.

While the invention has been shown and described in detail, the foregoing description is in all aspects illustrative and not restrictive. It is therefore understood that numerous modifications and variations can be devised without departing from the scope of the invention.

14

What is claimed is:
1. A printing apparatus comprising:
a printing unit configured to be capable of printing plural categories of test patterns on a printing medium;
a camera configured to output image data acquired by image capture of the test patterns; and
an image-data output unit configured to be capable of reducing an amount of data of the image data output from the camera, in accordance with each category of the test patterns, and outputting acquired image data,
wherein the image-data output unit includes a bit reduction circuit configured to reduce the number of bits per pixel representing color depth or color gradation in the image data output from the camera, and
wherein the bit reduction circuit reduces the number of bits per pixel in the image data output from the camera when one of the test patterns is a pattern for front/back verification or a pattern for registration adjustment.

2. The printing apparatus according to claim 1, wherein, when one of the test patterns is a test pattern for checking discharge of ink from each nozzle, the image-data output unit outputs luminance data extracted from the image data.

3. The printing apparatus according to claim 1, wherein, when one of the test patterns is a test pattern for front/back verification in which a coincidence between a position of an image printed on a first surface of the printing medium and a position of an image printed on a second surface opposite to the first surface is verified, the image-data output unit outputs at least one piece of plain data selected from red plain data, green plain data, or blue plain data extracted from the image data.

4. The printing apparatus according to claim 1, wherein the image-data output unit outputs low-resolution image data in which resolution is reduced in the image data.

5. The printing apparatus according to claim 1, further comprising
a printing control unit configured to control the printing unit, wherein
the printing control unit outputs category information indicating the categories of the test patterns to the image-data output unit, and
the image-data output unit reduces an amount of data of the image data on the basis of the category information output from the printing control unit.

6. The printing apparatus according to claim 1, wherein
the printing unit is capable of printing a test pattern including category information on the printing medium,
the camera is capable of capturing an image of the category information, and
the image-data output unit reads the category information included in the image data and reduces an amount of data of the image data on the basis of the read category information.

7. The printing apparatus according to claim 1, wherein the image-data output unit recognizes an area of a test pattern included in the image data and a category of the test pattern by performing an image recognition process on the image data, and reduces an amount of data of the image data in accordance with the recognized category of the test pattern.

8. The printing apparatus according to claim 1, wherein the image-data output unit outputs image data acquired without reduction of the number of bits per pixel in the image data output from the camera when one of the test patterns is a pattern for a shading check.

* * * * *